United States Patent [19]

Babel

[11] Patent Number: 4,759,114

[45] Date of Patent: Jul. 26, 1988

[54] TOOL MAGAZINE

[75] Inventor: Werner Babel, Achweg, Fed. Rep. of Germany

[73] Assignee: MAHO Aktiengesellschaft, Pfronten, Fed. Rep. of Germany

[21] Appl. No.: 81,845

[22] Filed: Aug. 5, 1987

[30] Foreign Application Priority Data

Aug. 13, 1986 [DE] Fed. Rep. of Germany ....... 3627515

[51] Int. Cl.⁴ ............................................ B23Q 3/157
[52] U.S. Cl. ........................................ 29/568; 211/1.5
[58] Field of Search ................ 29/568, 26 A; 211/1.5; 409/134; 408/235, 35, 710

[56] References Cited

U.S. PATENT DOCUMENTS

| 4,196,506 | 4/1980 | Reed | 29/568 |
|---|---|---|---|
| 4,238,034 | 12/1980 | Sipek et al. | 211/1.5 |
| 4,358,888 | 11/1982 | Zankl et al. | 29/568 |
| 4,535,527 | 8/1985 | Fischer et al. | 29/568 |
| 4,683,638 | 8/1987 | Winkler et al. | 29/568 |
| 4,700,452 | 10/1987 | Babel | 29/568 |

Primary Examiner—William R. Briggs
Attorney, Agent, or Firm—Baker, Maxham & Jester

[57] ABSTRACT

A tool magazine, especially for milling and drilling machines, comprising a linear tool support having at least one row of tool holders, the tool support being mounted on the free ends of two swivel arms. Each swivel arm is disposed laterally of the work table and is mounted on a shaft for rotation therewith, the shaft being located in the work table. For protecting the tools inserted in the various tool holders and the tool tapers thereof, a cover is provided which contains a row of protective caps adapted to the shape of the tool tapers. The cover with the protective caps can be moved by means of a pivot lever mechanism from a position closely encompassing the tool tapers to a position permitting free access to the tool tapers. Any deposits of flushing liquid, dust particles and cuttings on the taper surfaces are effectively prevented when covered by the protective caps.

25 Claims, 1 Drawing Sheet

TOOL MAGAZINE

FIELD OF THE INVENTION

The invention is directed to a tool magazine, especially for milling and drilling machines, and more particularly to protective cap means for protecting the tool tapers of a plurality of tools from contamination during machine operation.

BACKGROUND OF THE INVENTION

A tool magazine of the general type with which this invention is concerned is known from German patent publication No. 3,447,706, owned by applicant. The special feature of this magazine resides in that for the assembly and removal of the tools in and from the horizontal or vertical spindle no separate tool changer is required. In earlier conventional tool changing systems a separate tool changer would provide for the transfer and loading of the tools between the tool magazine and the respective work spindle. As shown in the above German patent publication, by pivoting the tool magazine, including one or two rows of tool holders, to the rest position beneath the work table, the risk of collisions between the magazine and the workpiece or the headstock is eliminated, and the entire normal operating range of the respective machine tool can thereby be fully utilized.

Although this known tool magazine is provided with a cover for covering the loaded tool support in the lower rest position thereof, it does not provide a positive means by which the tool tapers remain free from deposits such as cuttings, dirt particles or flushing liquid. Such deposits on the tool tapers may result in problems upon insertion and fixing of the tools in the work spindles that would prevent proper seating and operation of the tools.

SUMMARY OF THE INVENTION

It is an object of the invention to substantially improve the magazine of the kind described above in such a way that the tool tapers are positively protected against deposits such as cuttings, flushing liquid or the like.

Broadly speaking, the invention provides a multi-element cover with the elements being adapted to provide positive protection of tool tapers against accidental contamination.

With the additional cover according to the invention it is ensured that the tool tapers, when postioned in the lower rest position, are kept free from cuttings and splashes of flushing liquid flying about in this area, whereby assembly in the respective work spindle is ensured without any problems. The protective cover is preferably configured as a series of elements in the shape of small caps matched with the shape of the tool tapers and is mounted on a rail extending in parallel to the tool support. The rail is moved by a lever linkage, which engages at least one end thereof to an open and closed position, respectively, in dependence on the respective pivoting movement of the magazine swivel arms. By means of a connecting link guide on the inner end of the swiveling lever mechanism, which is housed in the box-like swivel arm, the movement of the protective cover is coupled to the movement of the swivel arms. The protective cover is only removed from the tool tapers immediately before reaching its changing position.

The necessary coordination between the opening and closing movement of the cover and the corresponding pivoting movements of the magazine is achieved by mounting the cover on two brackets fixed laterally on the work table and by a connecting link guide which, by engagement of a pin in a slot, becomes effective only at a predetermined angular position of the swivel arms.

BRIEF DESCRIPTION OF THE DRAWING

The objects, advantages and features of the invention will be more readily appreciated from the following detailed description when read in conjunction with the accompanying drawing, in which.

DESCRIPTION OF THE PREFERRED EMBODIMENTS

Figure 1:
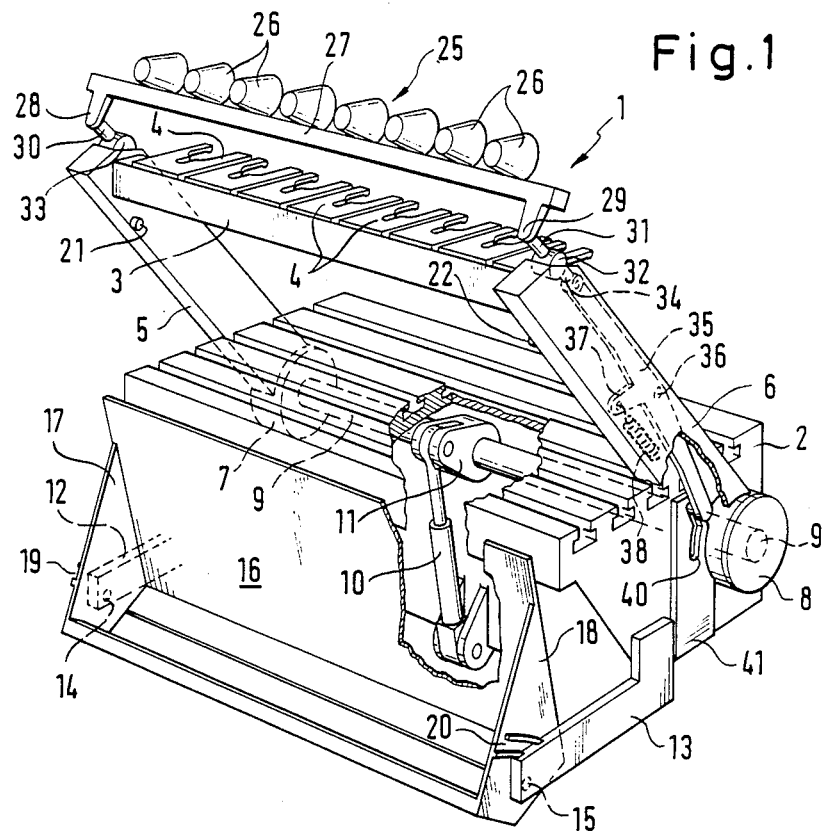
FIG. 1 is a perspective view of the work table of a knee-type milling machine including a tool magazine of the invention in the upper changing position.

In the embodiment illustrated in the drawing, tool magazine 1 is mounted on work table 2 of a knee-type milling machine (not illustrated). The tool magazine comprises horizontal tool support 3 on which a number of tool holders 4 are secured which are adapted in known manner for securely holding tool tapers (not illustrated). The two end faces of the horizontal tool support are rigidly mounted on respective swivel arms 5 and 6, the other ends of which are fixed on common horizontal shaft 9 through respective hubs 7 and 8. Shaft 9 is mounted in the work table and is rotated by actuating cylinder 10 and crank 11.

Figure 2:
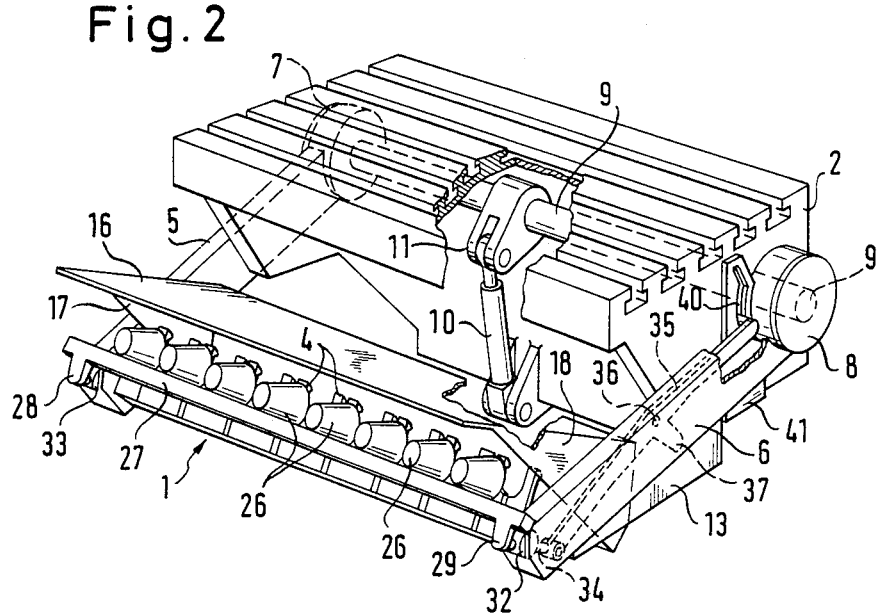
FIG. 2 is a perspective view of the work table of FIG. 1 including the tool magazine in the lower rest position.

On each sidewall of work table 2 one of angled brackets 12, 13 is rigidly mounted, each bracket having a journal 14, 15 provided on its freely projecting end portion. These journals, which are in alignment with each other, are used for pivotally mounting hood-shaped flap 16 and are engaged in corresponding holes in sidewalls 17 and 18 of the flap. At a suitable position relative to journals 14 and 15, each sidewall 17, 18 is formed with a guide slot 19, 20 in which a pin 21, 22 mounted on the inner surface of each swivel arm 5, 6 engages during movement of the swivel arms. The position of slots 19 and 20 relative to journals 14 and 15 on the sidewalls of the hood-shaped flap is chosen such that by the engagement of pins 21 and 22 flap 16 is driven in retarded fashion by swivel arms 5 and 6 and pivots from the position shown in FIG. 1 to the position of FIG. 2.

In addition to flap 16 the illustrated embodiment is provided with cover 25 for the tool tapers contained in the magazine. This cover comprises a row of protective caps 26 corresponding as to number and arrangement to the tool positions, the protective caps being secured on a continuous rail 27 which extends parallel to tool support 3. The end portions of rail 27 have rear cross-lugs 28 and 29 either integrally formed therewith or rigidly mounted thereto which, together with link pins 30 and 31, constitute respective angle levers. Hinge joints 32 and 33 are respectively hingedly joined by means of a further diametrically opposed link pin 34 to the free end of double lever 35 which is mounted in respective box-like swivel arm 5, 6 for pivoting movement about central pin 36. Spring 38 acts on a cross bar 37 of each double lever 35 to apply a suitable torque to the double lever. The other end of the double lever is provided with a cross pin which together with approximately vertically angled arcuate slot 40 formed in respective bar 41 on each sidewall of work table 2 constitutes a connecting link guide.

Operation of the above-described tool magazine comprising the protective cover 25 for the individual tool tapers will now be described. In the rest position shown in FIG. 2, the tools inserted in tool holders 4 of tool support 3 are positioned beneath flap 16 which is pivoted to the illustrated closed position. In this position the upwardly directed tool tapers are completely and tightly enclosed by protective caps 26. For performing a tool change in a work spindle (not illustrated), fluid under pressure is applied to actuating cylinder 10 for moving swivel arms 5 and 6 by means of crank 11 and shaft 9 from the position of FIG. 2 to the elevated changing position of FIG. 1. In this changing position the tools (not illustrated), including the tool tapers, are vertically positioned and by means of a feed motion of the vertical head the respective tools can be transferred or received. The kinematics of the lever mechanism constituted by double lever 35 and link pins 30, 31 and 32 is designed by proper shaping of angled slot 40 in such a way that a separate elevating movement of cover 25 from the tool tapers takes place only immediately before the actual changing position is reached. During the upward pivoting motion of swivel arms 5 and 6 to the changing position of FIG. 1, flap 16 is pivoted to the position illustrated in FIG. 1. The flap remains in that position due to its dead weight until pins 21 and 22, in response to a lowering movement of the magazine, engage in guide slots 19 and 20 and drive the flap to the closed position.

The invention is not limited to the illustrated embodiment. For example, the double levers need not be integrated in the swivel arms but may be arranged in parallel therewith. Moreover, it is possible to use, instead of the lever mechanism, suitable positioned chain drive mechanisms. Finally, it is possible to provide, instead of separate protective caps 26, a continuous funnel-shaped trough which is divided by inner transverse walls into a corresponding number of single compartments.

In view of the above description it is likely that modifications and improvements will occur to those skilled in the relevant art which are within the scope of the appended claims.

What is claimed is:

1. A tool magazine adapted for milling and drilling machines, said machines having a work table, said tool magazine comprising:
    a linear tool support having a row of tool holders adapted to hold a plurality of tools;
    power driven swivel arms laterally spaced and privotally mounted on said work table, said tool support being mounted on said swivel arms and being selectively movable between a lower rest position and an upper tool changing position;
    a flap pivotally mounted to said work table and adapted to be actuated in synchronism with said swivel arms, said flap, when said tool support is in the rest position beneath said work table, covering said tool support and the tools when mounted therein;
    a movable cover pivotally mounted to said swivel arms, said movable cover comprising a plurality of protective caps adapted to positively protect the tapers of the tools when mounted in said tool holder, said protective caps being mounted in linear arrangement to said movable cover; and
    means for moving said tool holder and said movable cover between the upper and lower positions, said movable cover and protective caps being lifted off the tool tapers when moved to the upper position.

2. The tool magazine recited in claim 1, wherein:
    said movable cover comprises a rail to which said protective caps are mounted; and
    said moving means comprises a lever mechanism for moving said rail and caps between the open and closed position.

3. The tool magazine recited in claim 2, wherein said lever mechanism is oriented approximately parallel with at least one of said swivel arms and is actuated by the pivoting motion thereof.

4. The tool magazine recited in claim 2, wherein said lever mechanism comprises a double lever centrally mounted in at least one of said swivel arms and having a proximate end and a distal end, said proximate end being guided in a connecting link guide secured to said work table, said distal end being connected by link pins of a swivel joint to an angle lever rigidly secured to said rail.

5. The tool magazine recited in claim 3, wherein said lever mechanism comprises a double lever centrally mounted in at least one of said swivel arms and having a proximate end and a distal end, said proximate end being guided in a connecting link guide secured to said work table, said distal end being connected by link pins of a swivel joint to an angle lever rigidly secured to said rail.

6. The tool magazine recited in claim 1, wherein for each tool or tool taper in said tool holder one of said protective caps of exactly matching shape is provided.

7. The tool magazine recited in claim 2, wherein for each tool or tool taper in said tool holder one of said protective caps of exactly matching shape is provided.

8. The tool magazine recited in claim 3, wherein for each tool or tool taper in said tool holder one of said protective caps of exactly matching shape is provided.

9. The tool magazine recited in claim 4, wherein for each tool or tool taper in said tool holder one of said protective caps of exactly matching shape is provided.

10. The tool magazine recited in claim 5, wherein for each tool or tool taper in said tool holder one of said protective caps of exactly matching shape is provided.

11. The tool magazine recited in claim 1, wherein said movable cover is configured as a trough partitioned by transverse walls to form compartments adapted to protectively cover the tool tapers.

12. The tool magazine recited in claim 2, wherein said movable cover is configured as a trough secured to said rail, said trough being partitioned by transverse walls to form compartments adapted to protectively cover the tool tapers.

13. The tool magazine recited in claim 3, wherein said movable cover is configured as a trough secured to said rail, said trough being partitioned by transverse walls to form compartments adapted to protectively cover the tool tapers.

14. The tool magazine recited in claim 4, wherein said movable cover is configured as a trough secured to said rail, said trough being partitioned by transverse walls to form compartments adapted to protectively cover the tool tapers.

15. The tool magazine recited in claim 5, wherein said movable cover is configured as a trough secured to said rail, said trough being partitioned by transverse walls to form compartments adapted to protectively cover the tool tapers.

16. The tool magazine recited in claim 1, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

17. The tool magazine recited in claim 2, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

18. The tool magazine recited in claim 3, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

19. The tool magazine recited in claim 4, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

20. The tool magazine recited in claim 5, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

21. The tool magazine recited in claim 6, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

22. The tool magazine recited in claim 7, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

23. The tool magazine recited in claim 8, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

24. The tool magazine recited in claim 9, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

25. The tool magazine recited in claim 10, wherein said flap is mounted between two horizontal supporting brackets pivotally mounted on said work table, the means for actuating said flap comprising driving pins secured to said swivel arms, said driving pins in predetermined pivot positions being brought into and out of engagement with guide slots formed on the side walls of said flap for opening and closing said flap.

* * * * *